(12) United States Patent
Baron

(10) Patent No.: US 7,116,361 B2
(45) Date of Patent: Oct. 3, 2006

(54) IMAGE STORAGE QUEUE ADAPTED TO STORE IMAGES ACCORDING TO ARCHIVAL STATUS

(75) Inventor: John M. Baron, Longmont, CO (US)

(73) Assignee: Hewlett-Packard Development Company, Houston, TX (US)

( * ) Notice: Subject to any disclaimer, the term of this patent is extended or adjusted under 35 U.S.C. 154(b) by 868 days.

(21) Appl. No.: 09/845,390

(22) Filed: Apr. 30, 2001

(65) Prior Publication Data

US 2004/0201735 A1 Oct. 14, 2004

(51) Int. Cl.
*H04N 5/76* (2006.01)

(52) U.S. Cl. .................................................. 348/231.1

(58) Field of Classification Search ........... 348/231.99, 348/231.1, 231.2

See application file for complete search history.

(56) References Cited

U.S. PATENT DOCUMENTS

| | | | |
|---|---|---|---|
| 5,717,841 A * | 2/1998 | Farrell et al. | 358/1.15 |
| 6,137,589 A * | 10/2000 | Obrador et al. | 358/1.16 |
| 6,177,956 B1 * | 1/2001 | Anderson et al. | 348/207.99 |
| 6,335,742 B1 * | 1/2002 | Takemoto | 715/781 |
| 6,388,687 B1 * | 5/2002 | Brackett et al. | 345/810 |
| 6,445,460 B1 * | 9/2002 | Pavley | 358/1.15 |
| 2001/0052933 A1 * | 12/2001 | Nybo et al. | 348/207 |
| 2003/0107529 A1 * | 6/2003 | Hayhurst et al. | 345/1.1 |

* cited by examiner

*Primary Examiner*—David Ometz
*Assistant Examiner*—James M. Hannett

(57) ABSTRACT

In a digital camera, images are stored in chronological order in an image storage queue, and the ability of the camera to add additional images to the queue is related to the archival status of the images already in the queue.

15 Claims, 3 Drawing Sheets

- PRIOR ART -

IMAGE STORAGE QUEUE ADAPTED TO STORE IMAGES ACCORDING TO ARCHIVAL STATUS

FIELD OF THE INVENTION

This invention relates to photography, and more particularly to the management of stored images within a digital camera.

BACKGROUND

Digital cameras are adapted to capture and store image data in digital form. Referring to FIG. 1, a block diagram of a typical digital camera 100 is shown. An image acquisition unit 102 acquires image data, and converts it to a digital signal by itself or in conjunction with a standard analog/digital (A/D) converter. The image acquisition unit 102 is typically a charge-coupled device (CCD) or a complementary metal-oxide semiconductor (CMOS). The image acquisition unit 102 is electrically connected to a controller 104, which is adapted to receive signals from the image acquisition unit 102 and to control the operation of the camera 100. The controller 104 is typically a logic unit such as an application-specific integrated circuit (ASIC), a microprocessor, or a field-programmable gate array (FPGA). The controller 104 is connected to a memory storage unit 106, which is adapted to store image data captured by the image acquisition unit. The memory storage unit 106 is fixed or removable. A fixed memory storage unit 106 is typically a hard drive, internal flash memory or other device. A removable memory storage unit 106 typically includes both a drive and a removable storage medium, such as a floppy disk, optical disk, flash memory, proprietary device, or other media. In some digital cameras, a communications interface 108 is electrically connected to the controller 104, allowing for contact with an external information handling system 120. The external information handling system 120 is typically a personal computer, Internet appliance, personal digital assistant, laptop computer, or other device adapted to store and process information. The communications interface 108 is typically an interface circuit or modem adapted to transfer image data from the memory storage unit 106 to the external information handling system 120. The camera 100 also typically includes a display 110 electrically connected to the controller 104. The display 110 is typically a liquid-crystal display (LCD) or other device that can display one or more images stored in the memory storage unit 106.

As a number of images are stored as image data in the memory storage unit 106, the memory storage unit 106 fills up. The user offloads those images from the memory storage unit 106, by removing the removable storage medium from the camera 100, by transmitting image data from the memory storage unit 106 to an external information handling system 120 via the communications interface 108, or by another method. When the image data is offloaded from the memory storage unit 106, it is typically deleted from the memory storage unit 106 to make room for new image data to be stored. Deleting offloaded images frees up storage space in the memory storage unit 106. However, the deleted images can no longer be viewed or transmitted from the camera 100, even though the storage space that had been occupied by the offloaded images may not be needed right away for storing new image data.

SUMMARY

In a digital camera, images are stored in chronological order in an image storage queue, and the ability of the camera to add additional images to the queue is related to the archival status of the images already in the queue.

In one aspect of the invention, images are saved within a digital camera in a storage queue in the order they were taken. Images that have been archived to another device are marked as archived, and remain in the image storage queue in the camera. Thus, even after being archived, images in the image storage queue are available for viewing, sharing, or transmitting from the camera.

In another aspect of the invention, the image storage queue is full when no space remains in the camera for storing an additional image. When the image storage queue is full, further image acquisition depends on the archival status of the images already stored in the queue. If one or more images stored in the image storage queue are marked as archived, the oldest archived image is deleted from the queue, and one or more new images may be added to the queue. In this way, older images can be retained in the camera until such time as the memory space occupied by those images is needed to store new image data. If no images in the queue are marked as archived, additional images are not stored in the camera until the user archives or deletes at least one image stored in the camera.

The invention will be more fully understood upon consideration of the detailed description below, taken together with the accompanying drawings.

BRIEF DESCRIPTION OF THE DRAWINGS

Use of the same reference symbols in different figures indicates similar or identical items.

DETAILED DESCRIPTION OF THE PREFERRED EMBODIMENTS

Figure 1:
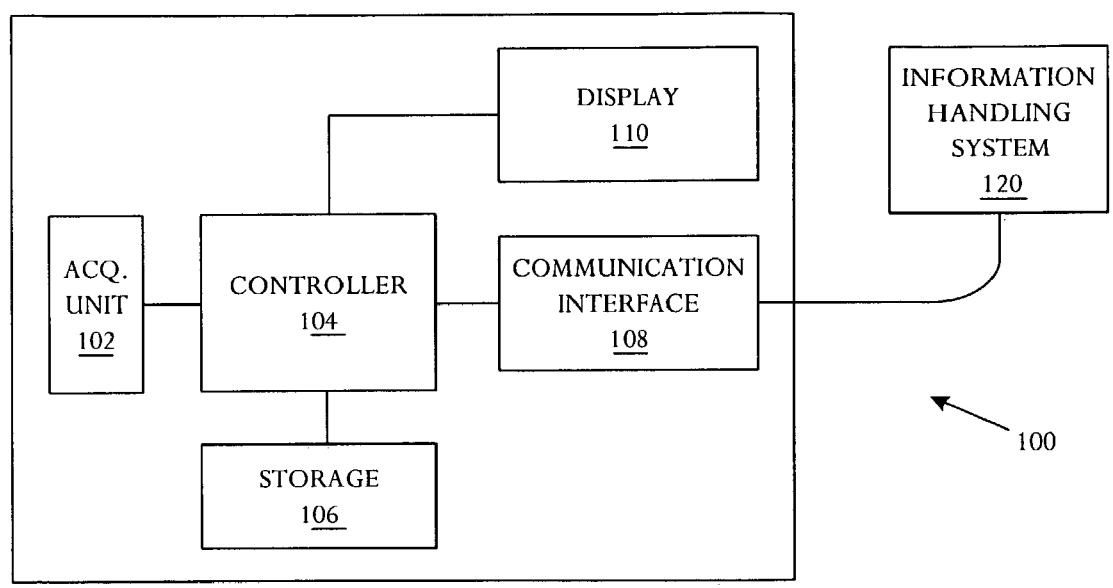
FIG. 1 is a block diagram of a prior art digital camera.
Figure 2:
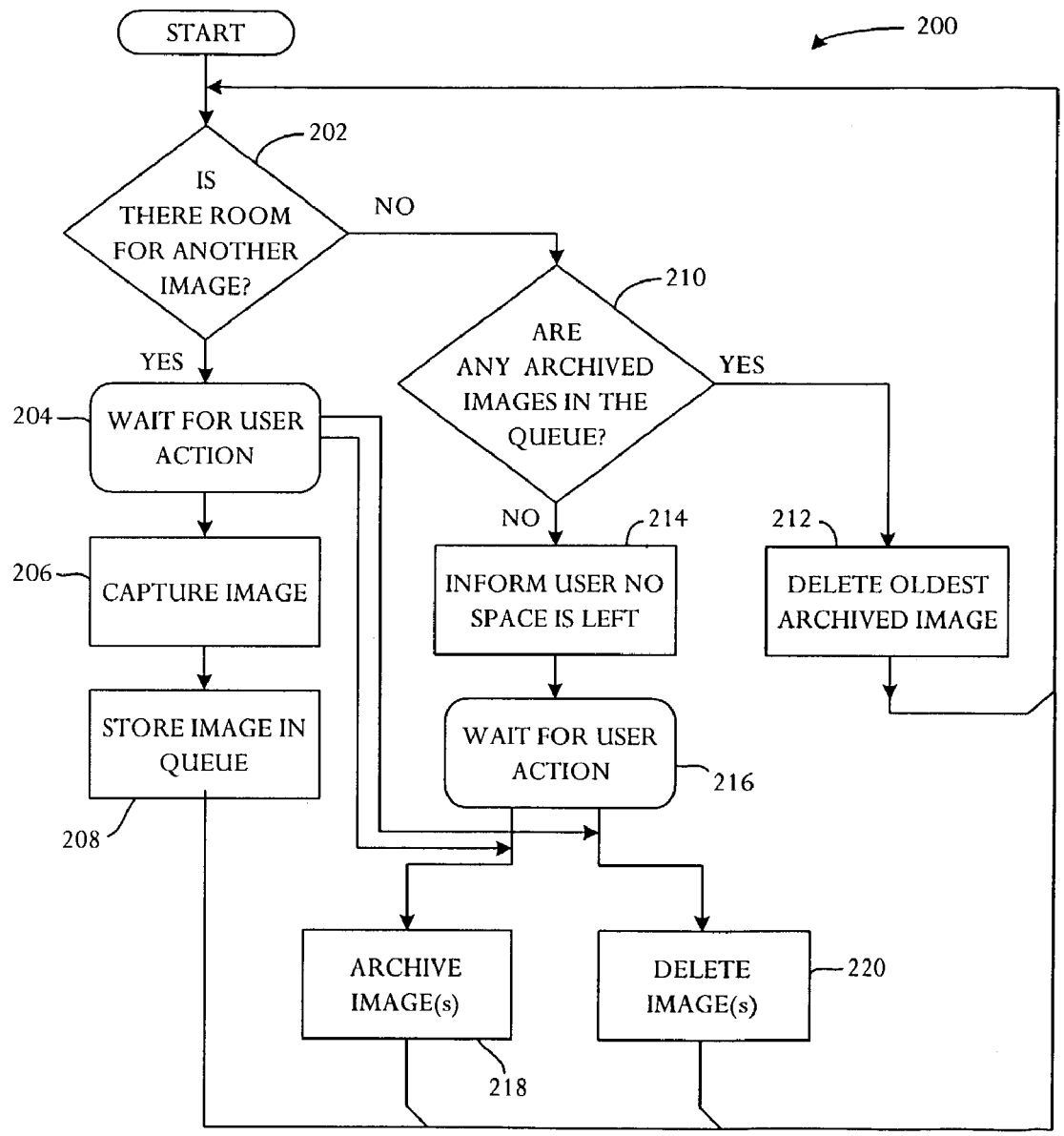
FIG. 2 is a flow chart of a method for handling image data within a digital camera.

Referring to FIG. 2, a method 200 for handling image data within a digital camera 100 is shown. At the beginning of the method 200, in block 202, the controller 104 determines whether the memory storage unit 106 has room for another image. Block 202 may be performed immediately upon powering up the camera 100, after capturing a previous image, or at any time when it is desirable to begin the method 200.

Figure 3:
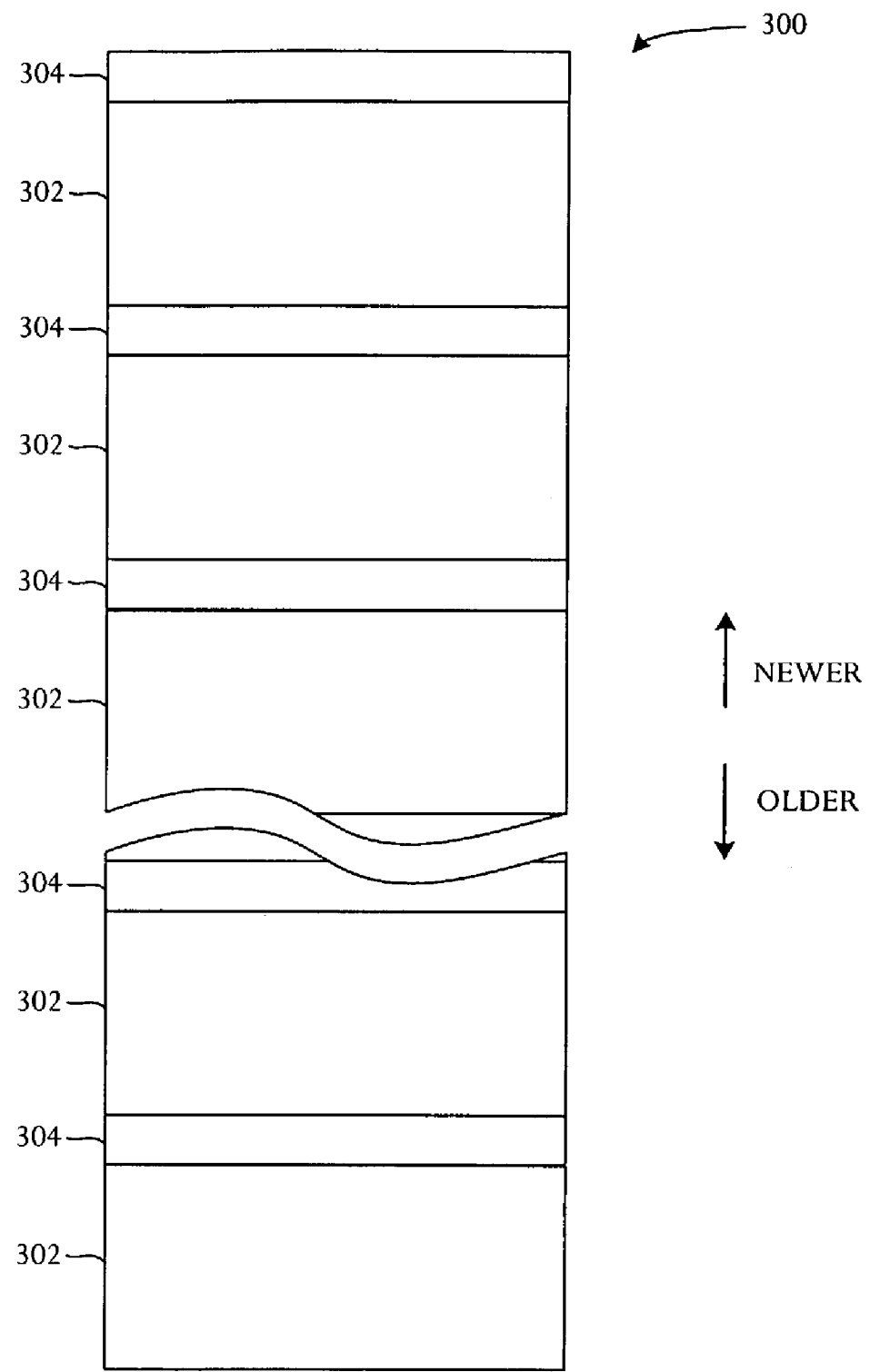
FIG. 3 is a block diagram of image data stored in an image storage queue.

Referring as well to FIG. 3, image data 302 is shown stored in an image storage queue 300, which is stored in the memory storage unit 106. The block diagram of the image storage queue 300 describes the data structure of the queue 300, and does not represent the physical location in the memory storage unit 106 of the stored image data 302 or a spatial relationship among individual image data elements 102. In one embodiment, the image storage queue 300 is represented as a linear structure in which individual image data elements 302 are each associated with a unique header 304. In one embodiment, the controller 104 generates a header 304 that includes data regarding one or more characteristics of the associated image data element 302. The header 304 includes information relating to the archival status of the associated image data element 302, as described in greater detail below. The header 304 additionally may include data relating to the time or date on which the associated image data 302 was captured. Instead, or in addition, the header 304 may include data relating to the sequence in which the associated image data 302 was captured, relative to the other image data elements 302 in the image storage queue 300. Further explanation of the function of the headers 304 and the archival process is provided below.

In another embodiment, headers 304 are not used in the image storage queue 300. Instead, storage of sequence and archive information is performed by filename. That is, the image data elements 304 are stored as files in the memory storage unit 106, where each file has a unique filename. Further explanation of this embodiment is provided below.

In block 202, the image storage queue 300 may have no image data 302 stored in it, or one or more image data elements 302 and associated headers 304. The controller 104 determines whether adequate storage space exists in the memory storage unit 106 for storing another image data block 302 and header 304. That is, the controller 104 determines whether the memory storage unit 106 is full, where "full" is defined as the condition that exists when inadequate storage space exists in the memory storage unit 106 for storing another image data block 302 and header 304. The storage space required for another image data block 302 and header 304 may vary depending on user-selected criteria associated with the characteristics of the image data to be captured. That is, the user may select options for image capture via the controller 104 that relate to the storage space required for the image data block 302. Such options may include resolution, picture shape (e.g., standard vs. landscape), and other options on which the storage space required for the image data block 302 may depend. If the memory storage unit 106 is full, the process 200 moves to block 210. However, if in block 202 it is determined that the memory storage unit 106 is not full, the process 200 moves to block 204.

In block 204, the controller 104 waits for a user action. If the user wishes to capture an image, the process 200 moves from block 204 to block 206. In block 204, if the user decides to archive one or more images, the process 200 moves from block 204 to block 218, which is described in greater detail below. If in block 204 the user decides to delete one or more images, the process 200 moves from block 204 to block 220, which is described in greater detail below. The user may simply turn off the camera 100 in block 204, rather than selecting any of these options. If so, the process 200 may restart at block 202 when the user reactivates the camera 100.

As described above, if in block 204 the user wishes to capture an image, the process 200 moves to block 206, in which an image is captured. The image may be captured in response to user input, such as the depression of a button (not shown) on the camera 100, where the button is electrically connected to the controller 104. The image may instead be captured in response to other input, such as input from a timer (not shown), an external control signal, or other input. The image acquisition unit 102 acquires an image and transmits image data to the controller 104, which routes the image data into the memory storage unit 106. Image capture is standard in the art, as described above.

In block 208, the image data captured in block 206 is stored in a queue in the memory storage unit 106. In one embodiment, image data 302 is arranged sequentially in the image storage queue 300. Conceptually, in one embodiment, newer image data elements 302 are located closer to the top of the queue 300 and older image data elements 302 are located closer to the bottom of the image storage queue 300. The newly-captured image acquired in block 206 is stored at the top of the image storage queue 300, where the top of the image storage queue 300 is occupied by the newest image data element 302 and its associated header 304. The image data element 302 and associated header 304 that had previously occupied the position at the top of the image storage queue 300 are shifted downward in the queue 300 as a result.

In another embodiment, where headers 304 are not used in association with the image data elements 302, the newest image data element 302 is assigned a unique filename identifying it as the last sequentially-captured image data element 302 stored in the memory storage unit 106. Table 1 below is an example of the contents of the image storage queue 300 in this embodiment, where the image data element 302 at the top of Table 1 is the newest image data element 302. In this example, the filename of each image data element 302 is a number that is incremented by one when a new image data element 302 is received. Thus, a simple ordinal system is used to track the sequential order in which the image data elements 302 are stored. While decimal numbers are used in this example, binary, octal, hexadecimal, or other numbering systems may be used. Further, the filenames may be shorter, if desired. The filename is long enough that a unique filename can be assigned to each image data element 302. Thus, the length and content of the filename of each image data element 302 is related to the minimum size of the image data elements 302 and the storage capacity of the memory storage unit 106.

TABLE 1

Example of Contents of Image Storage Queue 300

| Queue contents by filename | Explanation |
| --- | --- |
| 00000371.jpg | Newest image data element 302 in queue 300 |
| 00000370.jpg | Next newest image data element 302 in queue 300 |
| 00000368.jpg | Oldest unarchived image data element 302 in queue 300 (00000369.jpg has been deleted |
| _00000367.jpg | Newest archived image data element 302 in queue 300 (older than 00000368.jpg) |
| _00000366.jpg | Next newest archived image data element 302 in queue 300 |
| _00000363.jpg | Oldest archived image data element 302 in queue 300 |

In another embodiment, where headers 304 are not used in association with the image data elements 302, the newest image data element 302 is placed in a directory, subdirectory, or other organizational structure that is reserved for image data elements 302 that have not yet been archived.

After storing the image data element 302 and its associated header 304 (if any) in the image storage queue 300 in block 208, the process 200 returns to block 202. If in block 202 it is determined that the memory storage unit is full, the process 200 moves to block 210. In block 210, the controller 104 reviews the image storage queue 300 and determines whether any headers 304 in the queue 300 identify an associated image data block 302 as archived. In one embodiment, the controller 104 reviews the headers 304 and determines whether a particular data bit in each header 304 is set high or low, where the status of that data bit is associated with the archival status of the associated image data element 302. If other indicators are used in each header 304 to identify an archived image data element 302, then the controller 104 searches for those particular indicators.

In another embodiment, where headers 304 are not used, the filename of an image data element 302 is changed upon archiving to reflect its archival status. In the exemplary image storage queue 300 of Table 1, an underscore character is added to the beginning of the filename of an image data element 302 upon archiving. Other characters, numbers, or sets of characters or numbers could be used instead of the underscore character, if desired. By adding a character to the filename, and retaining the contents of the original filename, the sequence information contained in the filename is retained while archival information is added. While an underscore character is appended to the archived image data elements 302 in the example of Table 1, a different character, or multiple characters, could be used to indicate that an image data element 302 has been archived. Similarly, in another embodiment an underscore character or one or more different or additional characters may be added to the filename of each image data element 302 that has not been archived. In such an embodiment, the character or characters appended to the filename of an image data element 302 are removed upon archiving of that image data element 302. In another embodiment, where headers 304 are not used, an image data element 302 is indicated as archived by placing it in a directory, subdirectory, or other organizational structure that is reserved for archived image data elements 302. Such an embodiment may be utilized by itself, or in conjunction with one or more other embodiments for handling image data elements 302 without the use of headers 304.

If at least one image data element 302 in the queue 300 has been archived, the process moves from block 210 to block 212.

In block 212, at least one archived image data element 302 and its associated header 304 are deleted from the memory storage unit 106, in order to free memory storage space for a new image data element 302 and associated header 304. The controller 104 may direct this deletion. In one embodiment, if more than one image data element 302 is archived, the oldest archived image data element or elements 302 and their associated headers 304 are deleted. In the embodiment where headers 304 are not used, the oldest archived image data element 302 is __00000363.jpg, and at least that image data element 302 is deleted. In this way, archived image data elements 302 can be retained in the camera 100 in the memory storage unit 106 as long as possible. In another embodiment, one or more archived image data elements 302 and associated headers 304 other than the oldest archived image data element 302 are deleted. The process 200 then returns to block 202.

In another embodiment, each image data element 302 includes in its associated header 304 data relating to the order in which the image data 302 was captured. In this way, the image data elements 302 in the queue are ranked from first to last, where "first image" refers to the most recent image data 302 captured and "last image" refers to the image data 302 at the opposite end of the queue 300. In this embodiment, the last image is deleted. If desired, other images near the last image in the queue 300 may be deleted as well.

If in block 210 there are no archived images in the queue 300, the process 200 moves from block 210 to block 214. In block 214, the user is informed that the memory storage unit 106 is full. In one embodiment, a message is displayed to the user on the display 110 indicating that the memory storage unit 106 is full. In another embodiment, an LED or other indicator on the camera 100 lights to indicate to the user that the memory storage unit 106 is full. The particular method by which the user is informed that the memory storage unit 106 is full is not critical to the invention.

Next, in block 216, the controller 104 waits for a user action. If the user decides to archive one or more images, the process 200 moves from block 216 to block 218. In block 218, one or more image data elements 302 are archived, and the associated headers 304 are marked as archived. In the embodiment in which headers 304 are not used, a character, number, or set of characters or numbers is added to the filename of each archived image data element 302 to mark it as archived. As used in this document, the terms "archive" and "archiving" refer to the transmission of image data 302 from the memory storage unit 106 to an external information handling system 120. In one embodiment, this transmission is performed via the controller 104 and the communications interface 108. In another embodiment, this transmission is performed by removing a removable storage medium from the camera 100 and physically connecting that removable storage medium to a drive or other receptacle associated with an external information handling system 120. In such an embodiment, the communications interface 108 need not be provided.

To archive one or more image data elements 302, one or more image data elements 302 are selected by the user for archiving. In one embodiment, one or more buttons or similar controls (not shown) are provided on the body of the camera 100 and connected to the controller 104. The user manipulates these controls to select one or more stored image data elements 302 via a graphic interface on the display 110 of the camera 100. For example, the user may utilize one control to cycle through image data elements 302 stored in the queue 300, which are displayed as images on the display 110, and another control to select one or more of those displayed image data elements 302 for archiving. Image data elements 302 may be selected for archiving in other ways, if desired. The selection of a particular stored image data element 302 within the camera 100 is standard. The image data element or elements 302 selected for archiving need not include the most-recently acquired image data element 302 at the top of the queue 300. The selected image data element or elements 302 then are archived by copying them from the memory storage unit 106 to the information handling system 120. Such copying may be performed by connecting the camera 100 to an external information handling system 120 by a cable or by a wireless communications interface, such as an infrared connection; by removing a removable storage medium serving as the memory storage unit and connecting it to the appropriate receptacle or interface associated with the external information handling system 120; or in another way. The archived image data elements 302 remain in the memory storage unit 106 after being copied to the external information handling system 120.

Before being archived, the header 304 of an image data element 302 indicates that it has not been archived. When an image data element 302 is archived, its header 304 is marked to indicate that the associated image data element 302 has been archived. Such marking in block 208 may be performed in a number of ways. As one example, a bit may be provided in the header 304 that is set low if the associated image data element 302 has not been archived and is set high if the image data element 302 has been archived. That is, the data bit indicating archival status is inverted when the associated image data element 302 is archived. Other indicators may be used to mark a particular image data element 302 as archived. For example, in one embodiment in which headers 304 are not used, the filename of each archived image data element 302 indicates that it has been archived via the presence or absence of a character, number, or set of characters or numbers in the filename used to indicate that the image data element 302 has been archived. That is, the filename is altered by at least one character to indicate archival. As another example, an image data element 302 is marked as archived by placing it in a directory, subdirectory or other organizational structure that is reserved for archived image data elements 302. The process 200 then moves from block 218 back to block 202.

If in block 216 the user decides to delete one or more images, the process 200 moves from block 216 to block 220. In block 220, the user deletes one or more image data elements 302. In one embodiment, the user selects one or more image data elements 302 for deletion from the memory storage unit 106 and the queue 300. The selection of image data elements 302 for deletion may be performed with controls on the body of the camera 100 in conjunction with information shown on the display 110, in a similar manner as described above with regard to the selection of image data elements 302 for archiving. The user may wish to delete one or more stored data elements 302 if the user wishes to capture more images but an external information handling system 120 is not available for archiving.

In one embodiment, the block 202 is performed first in the process 200, in order to handle changes in the queue 300 that can result from the use of removable media as a memory storage unit 106. If a removable medium is used in conjunction with a drive, receiver or other receptacle as a memory storage unit 106, the contents of that removable medium may be changed while it is apart from the camera 100. If so, when the removable medium is reinserted into the camera 100, the image data elements 302 stored in that removable medium may differ from the image data elements 302 previously in the queue. Alternately, the user may exchange the removable medium that had been in the camera 100 with another removable medium, which already may include one or more image data elements 302, and associated headers 304 if headers 304 are utilized. For example, the user may exchange a full removable medium for one that is less full. As another example, the user may inadvertently insert a full removable medium into the camera. By initially checking whether there is room for another image in the memory storage unit 106, the processor 102 can determine whether space for an image data element 302 and header 304 is available on a newly-inserted removable medium.

While the preferred embodiment has been described in terms of the storage of image data in a digital camera, the storage queue management method described above is also applicable to the storage of data in other devices, such as the storage of audio data in a portable audio recorder or a fixed information handling system, or the storage of digital video data in a video camera or fixed information handling system.

The method 200 may be performed in hardware, software or a combination thereof. Software containing instructions for performing the method 200 may take the form of a computer program product. Such a computer program product may be stored on a physical medium, such as a hard disk, removable storage medium, optical disk, floppy disk, flash memory, or other physical data storage medium. The computer program product may also take the form of a signal transmitted across a communications network such as the Internet.

Although the invention has been described with reference to particular embodiments, the description is only an example of the invention's application and should not be taken as a limitation. Consequently, various adaptations and combinations of features of the embodiments disclosed are within the scope of the invention as defined by the following claims and their legal equivalents.

What is claimed is:

1. A method for handling image data within a digital camera having a memory storage unit for storing image data, the camera connectable to an external information handling system adapted to receive image data from the camera, the method comprising:
   storing image data elements in an image storage queue in a chronological order based on time of image capture by the camera;
   assigning each image data element an archival status;
   indicating said archival status of said image data element;
   determining capacity for the camera to add additional image data elements to the image storage queue as a function of said archival status and said chronological order in combination;
   detecting when the image storage queue is full;
   determining whether at least one image stored in the image storage queue is marked as archived; and
   if at least one image is marked as archived, deleting an oldest archived image from the image storage queue.

2. The method of claim 1, wherein each said image data element has a filename for identifying the image data element in a directory system, and wherein said indicating comprises naming said filename to indicate said archival status.

3. The method of claim 1, wherein said indicating comprises:
   creating an organizational structure comprising a file system directory including a reserved location for archived image data elements; and
   placing archived image data elements in said reserved location.

4. The method of claim 1, further comprising;
   archiving one said image data element, said archiving comprising copying said image data element to the external information handling system; and
   changing said archival status of said image data element to indicate that said data element is archived.

5. The method of claim 4, further comprising associating each said image data element with a header, wherein said changing said archival status comprises changing the contents of said header.

6. The method of claim 5, wherein said header comprises a data bit indicating archival status, wherein said changing the contents of said header comprises inverting said data bit.

7. The method of claim 4, wherein said image data element has a filename for identifying the image data element in a directory system comprising at least one character, and wherein said changing comprises altering said filename by at least one character.

8. The method of claim 4, further comprising receiving a selection of one said image data element for archiving.

9. The method of claim 4, wherein said archiving comprises:
   connecting the camera to the external information handling system; and
   copying said image data element from the memory storage unit in the camera to the external information handling system.

10. The method of claim 4, wherein the memory storage unit includes a removable storage medium, and wherein said archiving comprises:

removing the removable storage medium from the camera;

connecting the removable storage medium to the external information handling system; and copying said image data element from the removable storage medium to the external information handling system.

11. The method of claim 4, further comprising:

determining that the memory storage unit is full;

determining that no said image data element in said image storage queue has been archived; and notifying a user that the memory storage unit is full.

12. The method of claim 11, further comprising:

receiving a selection of an image data element for deletion; and deleting said selected image data element from the memory storage unit.

13. A method for handling image data within a digital camera having a memory storage unit for storing image data, the camera connectable to an external information handling system adapted to receive image data from the camera, the method comprising:

storing image data elements in an image storage queue in a chronological order based on time of image capture by the camera;

assigning each image data element an archival status;

indicating said archival status of said image data element;

determining capacity for the camera to add additional image data elements to the image storage queue as a function of said archival status and said chronological order in combination;

archiving one said image data element, said archiving comprising copying said image data element to the external information handling system; and changing said archival status of said image data element to indicate that said data element is archived;

determining that the memory storage unit is full;

determining that at least one said image data element in said image storage queue has been archived; and deleting from the memory storage unit at least one said archived image data element according to the chronological order.

14. The method of claim 13, wherein said deleting comprises deleting the oldest archived image data element in said image storage queue from the memory storage unit.

15. A digital camera adapted for connection to an external information handling system, the camera comprising:

an image acquisition unit;

a memory storage unit coupled to the image acquisition unit and configured to store plurality of image data elements chronologically based on time of image capture; and a controller coupled to the image acquisition unit and coupled to the memory storage unit, the controller assigning each image data element an archival status, indicating said archival status of said image data element, and determining capacity for the camera to add additional image data elements to the image storage queue as a function of said archival status and said chronological order in combination, wherein said controller is adapted for:

detecting when the image storage queue is full;

determining whether at least one image stored in the image storage queue is marked as archived; and if at least one image is marked as archived, deleting an oldest archived image from the image storage queue.

* * * * *

UNITED STATES PATENT AND TRADEMARK OFFICE
CERTIFICATE OF CORRECTION

PATENT NO.         : 7,116,361 B2
APPLICATION NO.    : 09/845390
DATED              : October 3, 2006
INVENTOR(S)        : John M. Baron It is certified that error appears in the above-identified patent and that said Letters Patent is hereby corrected as shown below:

On the title page, item (73), in "Assignee", in column 1, line 2, after "Company," insert -- L.P., --.

In column 8, line 38, in Claim 4, delete "comprising;" and insert -- comprising: --, therefor.

In column 10, line 16, in Claim 15, after "store" insert -- a --.

Signed and Sealed this

Fifth Day of May, 2009

JOHN DOLL
*Acting Director of the United States Patent and Trademark Office*